United States Patent
Westhäuser et al.

(10) Patent No.: US 12,409,704 B2
(45) Date of Patent: Sep. 9, 2025

(54) METHOD FOR INITIATING A DEFROSTING PROCESS OF A HEAT EXCHANGER OF A HEAT PUMP OF A MOTOR VEHICLE

(71) Applicant: Volkswagen Aktiengesellschaft, Wolfsburg (DE)

(72) Inventors: Jochen Westhäuser, Braunschweig (DE); Jan-Christoph Albrecht, Wolfsburg (DE); Sven Twenhövel, Sassenburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 284 days.

(21) Appl. No.: 17/671,026

(22) Filed: Feb. 14, 2022

(65) Prior Publication Data
US 2022/0258566 A1 Aug. 18, 2022

(30) Foreign Application Priority Data
Feb. 15, 2021 (DE) ................. 10 2021 201 377.5

(51) Int. Cl.
*B60H 1/00* (2006.01)

(52) U.S. Cl.
CPC ..... *B60H 1/00878* (2013.01); *B60H 1/00385* (2013.01); *B60H 1/00735* (2013.01);
(Continued)

(58) Field of Classification Search
CPC .......... B60H 1/00878; B60H 1/00385; B60H 1/00735; B60H 1/00764; B60H 1/00771;
(Continued)

(56) References Cited

U.S. PATENT DOCUMENTS 4,974,664 A * 12/1990 Glennon ............ B60H 1/00885
165/300
5,054,686 A * 10/1991 Chuang .................. B60R 25/00
236/1 R
(Continued)

FOREIGN PATENT DOCUMENTS

CA 2327844 C * 8/2003 ......... B60H 1/00735
CN 101746241 A 6/2010
(Continued)

OTHER PUBLICATIONS

Search Report for European Patent Application No. EP 2215 2253, dated Jun. 27, 2022.
(Continued)

*Primary Examiner* — Ljiljana V. Ciric
(74) *Attorney, Agent, or Firm* — PEARL COHEN ZEDEK LATZER BARATZ LLP

(57) ABSTRACT

A method for initiating a defrosting process of a heat exchanger of a heat pump of a motor vehicle, wherein a fan is assigned to the heat exchanger, wherein the power consumption and/or the speed of the fan is monitored, a defrosting process is initiated when the power consumption and/or the speed exceeds and/or falls below a threshold value, and the threshold value is determined as a function of a parameter, wherein the parameter is an indicator of a current relative air speed of the ambient air in relation to the motor vehicle.

12 Claims, 1 Drawing Sheet

(52) U.S. Cl.
CPC ..... *B60H 1/00764* (2013.01); *B60H 1/00771* (2013.01); *B60H 1/00778* (2013.01); *B60H 1/00828* (2013.01); *B60H 1/00899* (2013.01); *B60H 2001/00961* (2019.05)

(58) Field of Classification Search
CPC ............ B60H 1/00778; B60H 1/00828; B60H 1/00899; B60H 2001/00961; F25B 30/00; F25B 47/02
See application file for complete search history.

(56) References Cited

U.S. PATENT DOCUMENTS

| | | | | |
|---|---|---|---|---|
| 5,085,267 | A * | 2/1992 | Torrence | B60H 1/00885 318/641 |
| 5,117,643 | A * | 6/1992 | Sakurai | B60H 1/3208 62/133 |
| 5,284,025 | A * | 2/1994 | Kajitani | B60L 3/0061 62/238.7 |
| 5,440,486 | A * | 8/1995 | Rudzewicz | B60H 1/00842 237/5 |
| 5,588,481 | A * | 12/1996 | Dziama | B60H 1/00828 62/133 |
| 6,293,115 | B1 * | 9/2001 | Forrest | B60H 1/3207 62/186 |
| 6,330,979 | B2 * | 12/2001 | Yamashita | B60H 1/00821 237/12.3 B |
| 6,347,528 | B1 * | 2/2002 | Iritani | B60H 1/3207 62/434 |
| 6,367,271 | B2 * | 4/2002 | Forrest | B60H 1/3208 62/186 |
| 6,467,538 | B1 * | 10/2002 | Acre | B60H 1/02 165/44 |
| 6,685,099 | B2 * | 2/2004 | Rutyna | B60H 1/00778 454/258 |
| 6,965,813 | B2 * | 11/2005 | Granqvist | G05D 23/1924 700/278 |
| 7,121,368 | B2 * | 10/2006 | MacKelvie | B60K 11/00 123/41.12 |
| 7,210,523 | B2 * | 5/2007 | Umebayashi | B60H 1/00842 62/133 |
| 7,392,838 | B2 * | 7/2008 | Errington | B60H 1/00828 165/223 |
| 7,743,651 | B2 * | 6/2010 | Wakahara | F01P 11/16 73/114.68 |
| 8,485,249 | B2 * | 7/2013 | Sung | B60H 1/00828 165/271 |
| 8,733,126 | B2 * | 5/2014 | Sekiya | B60L 1/02 62/244 |
| 8,733,428 | B2 * | 5/2014 | Nakajima | B60H 1/00785 165/41 |
| 8,740,103 | B2 * | 6/2014 | Major | B60H 1/08 237/12.3 B |
| 9,150,132 | B2 * | 10/2015 | Hoke | B60H 1/00849 |
| 9,562,715 | B2 * | 2/2017 | Kandasamy | B60H 1/3232 |
| 9,605,889 | B2 * | 3/2017 | Qu | F25B 47/02 |
| 9,758,015 | B2 * | 9/2017 | Hoke | B60N 2/56 |
| 9,975,400 | B2 * | 5/2018 | Farooq | B60H 1/00778 |
| 10,377,208 | B2 * | 8/2019 | Hasan | B60H 1/00849 |
| 10,603,982 | B2 * | 3/2020 | Ragazzi | B60H 1/00392 |
| 10,639,961 | B2 * | 5/2020 | Wijaya | B60H 1/00849 |
| 10,914,504 | B2 | 2/2021 | Schmitz et al. | |
| 10,955,176 | B2 * | 3/2021 | Kasai | F25B 47/02 |
| 2002/0036080 | A1 * | 3/2002 | Itoh | F25B 41/385 165/231 |
| 2009/0301116 | A1 * | 12/2009 | Nathan | B60L 8/003 62/208 |
| 2011/0048824 | A1 * | 3/2011 | Starr | B60K 17/356 180/65.51 |
| 2012/0312520 | A1 * | 12/2012 | Hoke | B60N 2/5628 219/217 |
| 2013/0305759 | A1 * | 11/2013 | Tsunoda | B60H 1/321 62/277 |
| 2014/0083672 | A1 * | 3/2014 | Rollinson | B60H 1/00864 219/203 |
| 2016/0201961 | A1 * | 7/2016 | Miyakoshi | B60H 1/00914 62/133 |
| 2016/0238297 | A1 * | 8/2016 | Nuno | F25B 41/20 |
| 2020/0284497 | A1 | 9/2020 | Blatchley | |
| 2020/0353793 | A1 | 11/2020 | Choi et al. | |
| 2024/0392272 | A1 * | 11/2024 | Rabuka | C12N 15/86 |

FOREIGN PATENT DOCUMENTS

| | | | | |
|---|---|---|---|---|
| CN | 103328238 | A * | 9/2013 | ......... B60H 1/00007 |
| CN | 104245376 | A | 12/2014 | |
| CN | 104279800 | A | 1/2015 | |
| CN | 109 109 613 | A | 1/2019 | |
| DE | 2926777 | A1 | 1/1981 | |
| DE | 10 2011 051285 | A1 | 12/2012 | |
| DE | 112012000522 | T5 * | 10/2013 | ......... B60H 1/00007 |
| DE | 10 2009 052 409 | B4 | 3/2018 | |
| DE | 112012000522 | B4 * | 12/2020 | ......... B60H 1/00007 |
| EP | 563724 | B1 | 9/1996 | |
| EP | 1108573 | B1 * | 9/2004 | ......... B60H 1/00735 |
| EP | 1588875 | A1 | 10/2005 | |
| EP | 2 666 652 | A1 | 11/2013 | |
| EP | 2719966 | B1 | 5/2019 | |
| EP | 3643993 | A1 | 4/2020 | |
| EP | 4043251 | B1 * | 11/2023 | ......... B60H 1/00735 |
| FR | 2959005 | A1 * | 10/2011 | ............ B60H 1/321 |
| GB | 2293003 | A * | 3/1996 | ......... B60H 1/00764 |
| KR | 20090005819 | A | 1/2009 | |

OTHER PUBLICATIONS

Search Report for Chinese Patent Application No. 202210136419.4, dated Jan. 24, 2025.

* cited by examiner

METHOD FOR INITIATING A DEFROSTING PROCESS OF A HEAT EXCHANGER OF A HEAT PUMP OF A MOTOR VEHICLE

CROSS REFERENCE TO RELATED APPLICATION

This application claims priority from German Patent Application No. 10 2021 201 377.5, filed Feb. 15, 2021, which is hereby incorporated by reference in its entirety.

FIELD OF THE INVENTION

The present invention relates to a method for initiating a defrosting process of a heat exchanger of a heat pump of a motor vehicle, in particular of an electric vehicle or a battery-electric vehicle or a hybrid electric vehicle, wherein a fan is assigned to the heat exchanger, wherein a power consumption and/or a speed of the fan is monitored, wherein a defrosting process is initiated when the power consumption and/or the speed exceeds and/or falls below a threshold value.

The present invention also relates to a motor vehicle comprising a device for defrosting a heat exchanger of a heat pump of the motor vehicle, wherein the device has a computing unit.

BACKGROUND OF THE INVENTION

Heat pumps are used in electromobility to heat the vehicle interior. The heat required for heating is taken from the outside air. For this purpose, an ambient heat exchanger of the heat pump must be cooled below the ambient temperature. If the outside air falls below the dew point thereof, frost forms on the surface of the ambient heat exchanger, preventing the air from flowing through the heat exchanger. Efficient operation of the heat pump is then no longer ensured. In order to allow again a flow of outside air through the heat exchanger, defrosting cycles are necessary in which the heat exchanger is heated up. During the defrosting cycle, the ice melts and a flow through the heat exchanger can take place again.

Methods for initiating the defrosting process are known in the prior art, in which methods a decrease in the suction pressure of the heat pump is monitored.

Furthermore, methods are known in which an additional sensor system is used, with which methods the layer thickness of the ice or frost formed on the heat exchanger is measured.

An air/water heat pump having an evaporator is known from DE 10 2009 052 409 B4, a fan and a fan control unit being assigned to the evaporator. The fan control unit detects a current and/or a speed of the fan and determines an operating point of the fan based on the detected current and/or the speed. The fan control unit is designed to monitor the operating point of the fan and to forward a defrost initiation signal to a controller when a threshold value is undershot or exceeded.

EP 0 563 724 B1 discloses a method for determining the formation of ice on an evaporator of a cooling device, the cooling device having a fan driven by an electric motor for air to flow through the evaporator. In the method, the change in an operating parameter of the motor operating the fan is measured.

The disadvantage of the known methods, in which the suction pressure of the heat pump of the motor vehicle is monitored, is that the pressure can also temporarily fall below the suction pressure during the start-up process of the motor vehicle, so that unnecessary defrosting processes may be initiated.

In addition, known methods do not take into account that the power consumption or speed of a fan assigned to a heat exchanger in a motor vehicle can also depend on other parameters in addition to the thickness of the ice layer on the evaporator.

SUMMARY OF THE INVENTION

The present invention is based on the object of providing a method for initiating a defrosting process of a heat exchanger of a heat pump of a motor vehicle, which method is insensitive to external parameters influencing the air flow through the evaporator, and with which method unnecessary defrosting processes can be avoided.

To achieve the object on which the invention is based, a method for initiating a defrosting process of a heat exchanger of a heat pump of a motor vehicle, in particular of an electric vehicle or a battery-electric vehicle or a hybrid electric vehicle, is proposed, wherein a fan is assigned to the heat exchanger, wherein a power consumption and/or a speed of the fan is monitored, wherein a defrosting process is initiated when the power consumption and/or the speed exceeds and/or falls below a threshold value, wherein it is further provided that the threshold value is determined as a function of a parameter, the parameter being an indicator of a current relative air speed of the ambient air in relation to the motor vehicle.

The fan is assigned to the heat exchanger, this means that the fan is arranged either in front of or behind the heat exchanger in the flow direction and is designed to convey ambient air through the heat exchanger.

The heat exchanger is in particular an ambient heat exchanger.

If a layer of ice forms on the heat exchanger, the pressure loss on the air side at the heat exchanger increases. With increasing pressure losses, the amount of air conveyed decreases. If the speed of the fan is kept constant, the electrical energy requirement and thus the power consumption of the fan decrease with a significantly increased pressure loss. The electrical power consumption of the fan indicates the amount of air being conveyed and thus the efficiency of the heat pump. If the air mass flows are too low, the heat pump can no longer be operated efficiently and a defrosting process must be initiated.

By monitoring the power consumption of the fan and comparing it with a threshold value, in particular a power consumption threshold value, it can therefore advantageously be determined whether and when a defrosting process should be initiated for the heat exchanger.

If the fan is operated with constant power consumption, the speed increases with increasing pressure losses. Correspondingly, by monitoring the speed of the fan and comparing it with a threshold value, in particular a speed threshold value, it can advantageously be determined whether and when a defrosting process should be initiated for the heat exchanger.

According to the invention, it is now provided that the threshold value, in particular the power consumption threshold value or the speed threshold value, is determined as a function of a parameter, the parameter being an indicator of a current relative air speed of the ambient air in relation to the motor vehicle.

External circumstances that influence the current relative air speed of the ambient air in relation to the motor vehicle also influence the air mass flow through the heat exchanger and thus the so-called system characteristic of the heat pump. This means that the power consumption and/or the speed of the fan also depend on the external circumstances and are therefore insufficient parameters for assessing whether a defrosting process should be initiated.

Therefore, according to the invention, the initiation of a defrosting process is additionally made dependent on exceeding or falling below a threshold value, in particular a power consumption threshold value or a speed threshold value, on a further parameter which is an indicator of a current relative air speed of the ambient air in relation to the motor vehicle.

The dependency of the threshold value on the parameter can be determined with a calculation model or simulations. In addition, it is possible to provide a table or a characteristic field from which the respectively suitable threshold value can be taken for normal driving situations and external circumstances that influence the current relative air speed of the ambient air in relation to the motor vehicle.

A defrosting process is preferably initiated when the power consumption falls below the threshold value, in particular the power consumption threshold value, and/or when the speed exceeds the threshold value, in particular the speed threshold value. However, it can also be provided that a defrosting process is initiated when the power consumption exceeds the threshold value, in particular the power consumption threshold value, and/or when the speed falls below the threshold value, in particular the speed threshold value.

It is preferably provided that the parameter is the current driving speed of the motor vehicle.

If the motor vehicle is moved at a high driving speed, the relative air speed of the ambient air in relation to the motor vehicle increases. As a result, the power consumption of the fan can decrease while the speed is kept constant, without icing up of the heat exchanger being the cause of the decrease in power consumption.

In order to avoid an unnecessary defrosting process, the threshold value, in particular the power consumption threshold value and/or the speed threshold value, can therefore be adapted as a function of the current driving speed of the motor vehicle.

With a further advantage, it can be provided that the parameter is the wind speed and/or the wind direction.

In other words, the absolute wind speed and/or wind direction above the ground is taken into account in this case. By including the wind direction, it can also be taken into account whether the motor vehicle is traveling against the wind or with the wind.

With a further advantage, it can be provided that the parameter is a distance signal, preferably a distance value, of the motor vehicle in relation to a motor vehicle traveling in front.

Modern vehicles often have a so-called distance sensor system with which it can be determined whether the motor vehicle is behind a vehicle traveling in front. Some of these systems also determine the distance value, for example in meters. Due to the shielding provided by a vehicle traveling in front, the power consumption of the fan can increase if the speed is kept constant. This increase can mean that icing is not recognized in time. It is therefore advantageous if a distance signal and preferably the distance value of the motor vehicle in relation to a vehicle traveling in front are taken into account for the determination of the threshold value.

With a further advantage, it can be provided that the parameter is a vehicle position, the vehicle position preferably being a position of the motor vehicle in a road tunnel, in a valley, or in a street canyon.

The vehicle position can be determined by means of a navigation system of the motor vehicle. If the motor vehicle drives through a road tunnel, through a valley, or through a street canyon, this can result in a drop in the static ambient air pressure and in an increase in the relative air speed of the ambient air in relation to the motor vehicle. This change in air speed can also result in a change in the power consumption or the speed of the fan. It is therefore advantageous if the position of the vehicle is taken into account when determining the threshold value.

Preferably it can be provided that the threshold value is determined as a function of a dew point temperature of the air at the heat exchanger and/or for the defrosting process to be initiated only when the temperature of the air at the heat exchanger falls below the dew point temperature.

By taking into account the dew point temperature and/or the temperature, it can be avoided that a defrosting process is initiated, even if no ice has formed on the heat exchanger.

With a further advantage, it can be provided that the threshold value is determined as a function of the air density and/or the outside air temperature and/or the outside air humidity.

Furthermore, it can preferably be provided that the parameter is an opening degree of a radiator shutter.

The radiator shutters, which are preferably arranged in front of the heat exchanger in the direction of flow in the motor vehicle, influence the air mass flow through the heat exchanger depending on the opening degree. It is therefore advantageous if the opening degree of the radiator shutter is taken into account when determining the initiation of the defrosting process.

With a further advantage, it can be provided that the fan is operated for a short period of time at an increased or a decreased speed to determine whether a defrosting process should be initiated.

The fan is preferably operated for the short period at speeds of less than 50%, more preferably less than 30%, particularly preferably less than 20% of a setpoint speed. For example, it is advantageous to operate the fan at speeds in the range of 10 to 25% of the target speed even when there is sufficient air mass flow in order to derive the defrosting process therefrom.

The short period of time can be less than a minute, preferably less than 30 seconds, particularly preferably less than 20 seconds.

In principle, it is also possible to operate the fan for the short period of time at an increased speed, for example at a speed that is 20%, preferably 30%, particularly preferably 50%, higher than the target speed. During the operation of the fan at increased speeds, possible disturbance variables have a smaller influence on the determination of the need to initiate a defrosting process.

The operation of the fan can take place cyclically at increased or decreased speeds.

With a further advantage, it can be provided that the method is carried out when the motor vehicle is stationary or at a low driving speed.

In particular, it is advantageous in this case if the threshold value is adapted to the driving speed and/or to the relative air speed of the ambient air in relation to the motor vehicle.

A further solution to achieve the object on which the invention is based is to provide a motor vehicle, in particular an electric vehicle, a battery-electric vehicle, or a hybrid electric vehicle, wherein the motor vehicle has a device for defrosting a heat exchanger of a heat pump of the motor vehicle, wherein a fan is assigned to the heat exchanger, wherein the device has a computing unit, wherein the arithmetic unit is designed to carry out the method described above.

The motor vehicle preferably has sensors for the determination of the speed and/or the power consumption of the fan and/or for the determination of the wind speed and/or an opening degree of a radiator shutter and/or the current driving speed of the motor vehicle. In addition, the motor vehicle can have a distance sensor system for the determination of a distance signal, in particular a distance value, of the motor vehicle in relation to a vehicle traveling in front.

In addition, it can be advantageous if the motor vehicle has a navigation system by means of which a vehicle position can be determined.

The power consumption of the fan can be applied via the bus signal, for example, and then evaluated.

BRIEF DESCRIPTION OF THE DRAWINGS

The present invention is explained in more detail below with reference to the accompanying figures.

In the figures.

DETAILED DESCRIPTION OF THE INVENTION

Figure 1:
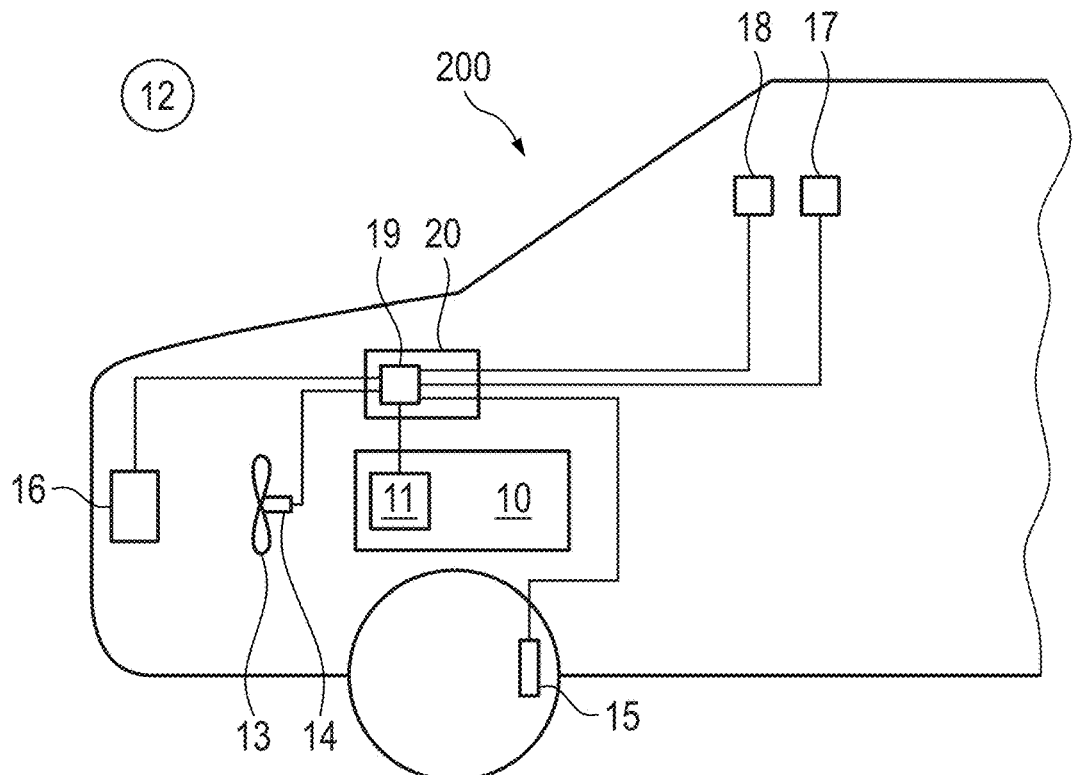
FIG. 1 shows a motor vehicle with a device for defrosting a heat exchanger of a heat pump.

FIG. 1 shows a motor vehicle 200 having a heat pump 10. The heat pump 10 comprises a heat exchanger 11 for absorbing heat from the ambient air 12. A fan 13 is assigned to the heat exchanger 11 of the heat pump 10, which fan is designed to conduct an air flow through the heat exchanger 11. The speed of the fan 13 can be determined by means of a speed sensor 14. The power consumption of the fan 13 is read out via a bus signal. The motor vehicle 200 also comprises a driving speed sensor 15, a distance sensor system 16, a temperature sensor 17, and a navigation system 18. The current driving speed of the motor vehicle 200 is determined with the driving speed sensor 15. The distance sensor system 16 generates a distance signal when the motor vehicle 200 drives behind a vehicle traveling in front. A specific distance value in meters to the vehicle traveling in front can preferably be determined by means of the distance sensor system 16. A vehicle position of motor vehicle 200 can be determined by means of the navigation system 18. In particular, it can be determined whether the motor vehicle 200 is in a tunnel, in a valley, or in a street canyon. The outside air temperature can finally be determined with the temperature sensor 17. These parameters determined with the sensors are indicators for a current relative air speed of the ambient air 12 in relation to the motor vehicle 200.

The speed of the fan 13 and the power consumption thereof as well as the driving speed of the motor vehicle 200, the distance signal, the vehicle position, and the outside air temperature are transmitted to a computing unit 19 of a device 20 for defrosting the heat exchanger 11. The computing unit 19 first determines a current speed threshold value and/or a current power consumption threshold value on the basis of at least one of the parameters driving speed, distance signal, vehicle position, or outside air temperature.

The power consumption and/or the speed of the fan 13 are then compared with the corresponding threshold value, in particular the power consumption threshold value and/or the speed threshold value, in the computing unit 19. When the speed and/or the power consumption exceeds or falls below the corresponding threshold value, the computing unit 19 instructs the device 20 to perform a defrosting process for the heat exchanger 11.

Figure 2:
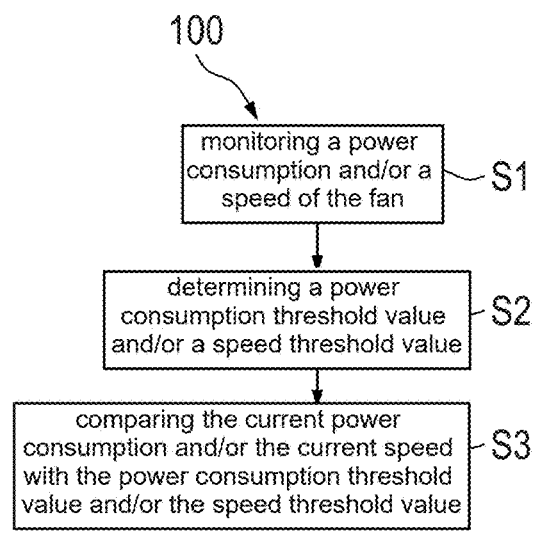
FIG. 2 is a block diagram of a method for initiating a defrosting process of a heat exchanger.

FIG. 2 shows a block diagram of a method 100 for initiating a defrosting process of a heat exchanger 11 of a heat pump 10 of a motor vehicle 200.

First of all, in a first method step S1, the current speed and/or the current power consumption of the fan 13 assigned to the heat exchanger 11 are determined. Furthermore, at least one of the parameters driving speed of the motor vehicle, distance between the motor vehicle and a vehicle traveling in front, vehicle position, and outside air temperature is determined. A threshold value, in particular a power consumption threshold value and/or a speed threshold value, is then determined from these parameters in a second method step S2. In a third method step S3, the current power consumption and/or the current speed is compared with the power consumption threshold value and/or the speed threshold value. When the power consumption or the speed falls below or exceeds the power consumption threshold value or the speed threshold value, a defrosting process for the heat exchanger 11 is initiated. Defrosting of the heat exchanger 11 can take place, for example, by a heating element of the device 20 for defrosting the heat exchanger 11.

LIST OF REFERENCE SIGNS

100 Method
200 Motor vehicle
10 Heat pump
11 Heat exchanger
12 Ambient air
13 Fan
14 Speed sensor
15 Driving speed sensor
16 Distance sensor system
17 Temperature sensor
18 Navigation system
19 Computing unit
20 Device
S1-S3 Method steps

The invention claimed is:

1. A method for initiating a defrosting process of a heat exchanger of a heat pump of a motor vehicle, wherein a fan is assigned to the heat exchanger, comprising:
   monitoring the power consumption and/or the speed of the fan, and
   initiating a defrosting process one or both of the power consumption and/or the speed of the fan exceeds and/or falls below a threshold value,
   wherein the threshold value is determined as a function of a parameter which is an indicator of a current relative air speed of ambient air in relation to the motor vehicle,
   wherein the threshold value is further determined as a function of the dew point temperature of the air at the heat exchanger, and/or
   wherein the defrosting process is only initiated when the temperature of the air at the heat exchanger falls below the dew point temperature.

2. The method according to claim 1, wherein the parameter is the current driving speed of the motor vehicle.

3. The method according to claim 1, wherein the parameter is the wind speed and/or the wind direction.

4. The method according to claim 1, wherein the parameter is a distance signal.

5. The method according to claim 4, wherein the distance signal is the distance value of the motor vehicle in relation to a vehicle traveling in front of the motor vehicle.

6. The method according to claim 4, wherein the vehicle position is a position of the motor vehicle in a road tunnel, in a valley, or in a street canyon.

7. The method according to claim 1, wherein the parameter is a vehicle position.

8. The method according to claim 1,
wherein the threshold value is further determined as a function of the air density and/or of the outside air temperature and/or the outside air humidity, and/or
wherein the parameter is an opening degree of a radiator shutter.

9. The method according to claim 1, wherein the fan is operated for a period of time of less than one minute at an increased or a decreased speed to determine whether a defrosting process should be initiated.

10. The method according to claim 1, wherein the method is carried out when the motor vehicle is stationary.

11. The method according to claim 1, wherein the motor vehicle is an electric vehicle, a battery-electric vehicle or a hybrid electric vehicle.

12. A motor vehicle comprising:
a device for defrosting a heat exchanger of a heat pump of the motor vehicle, and
a fan assigned to the heat exchanger,
wherein the device has a computing unit that is configured to carry out the method according to claim 1 for initiating a defrosting process of the heat exchanger.

* * * * *